US009140325B2

(12) United States Patent
Cox et al.

(10) Patent No.: US 9,140,325 B2
(45) Date of Patent: Sep. 22, 2015

(54) METHODS AND APPARATUS FOR SELECTIVE SPRING PRE-LOAD ADJUSTMENT

(75) Inventors: Christopher Paul Cox, Freedom, CA (US); Michael David Marquez, Santa Cruz, CA (US); Everet Owen Ericksen, Santa Cruz, CA (US)

(73) Assignee: Fox Factory, Inc., Watsonville, CA (US)

( * ) Notice: Subject to any disclaimer, the term of this patent is extended or adjusted under 35 U.S.C. 154(b) by 1195 days.

(21) Appl. No.: 12/727,915

(22) Filed: Mar. 19, 2010

(65) Prior Publication Data

US 2010/0252972 A1 Oct. 7, 2010

Related U.S. Application Data

(60) Provisional application No. 61/161,552, filed on Mar. 19, 2009, provisional application No. 61/161,620, filed on Mar. 19, 2009.

(51) Int. Cl.

| | |
|---|---|
| ***B60G 15/00*** | (2006.01) |
| ***F16F 1/12*** | (2006.01) |
| ***B60G 15/06*** | (2006.01) |
| ***F16F 9/32*** | (2006.01) |
| ***F16F 9/56*** | (2006.01) |

(52) U.S. Cl.

CPC .............. *F16F 1/121* (2013.01); *B60G 15/063* (2013.01); *F16F 9/3264* (2013.01); *F16F 9/56* (2013.01); *B60G 2204/1242* (2013.01); *B60G 2204/61* (2013.01); *F16F 2228/08* (2013.01)

(58) Field of Classification Search

USPC .................... 267/218, 195, 175, 177, 221, 34

See application file for complete search history.

(56) References Cited

U.S. PATENT DOCUMENTS

| | | | | |
|---|---|---|---|---|
| 1,923,011 A | | 8/1933 | Moulton | |
| 1,948,600 A | * | 2/1934 | Templeton | 52/126.6 |
| 2,259,437 A | * | 10/1941 | Dean | 475/299 |
| 2,492,331 A | | 12/1949 | Spring | |
| 2,540,525 A | * | 2/1951 | Howarth et al. | 248/578 |
| 2,697,600 A | * | 12/1954 | Gregoire | 267/287 |
| 2,784,962 A | * | 3/1957 | Sherburne | 267/173 |
| 2,879,971 A | * | 3/1959 | Demay | 251/61.4 |
| 2,991,804 A | | 7/1961 | Merkle | |

(Continued)

FOREIGN PATENT DOCUMENTS

| | | |
|---|---|---|
| DE | 202010012738 U1 | 12/2010 |
| EP | 304801 A2 | 3/1989 |

(Continued)

OTHER PUBLICATIONS

"European Patent Office Final Decision dated Mar. 21, 2013", European Patent Application No. 10161906.2.

(Continued)

*Primary Examiner* — Robert A Siconolfi
*Assistant Examiner* — James Hsiao

(57) ABSTRACT

A method and apparatus for a suspension comprising a spring having a threaded member at a first end for providing axial movement to the spring as the spring is rotated and the threaded member moves relative to a second component. In one embodiment, the system includes a damper for metering fluid through a piston and a rotatable spring member coaxially disposed around the damper and rotatable relative to the damper.

21 Claims, 4 Drawing Sheets

(56) References Cited

U.S. PATENT DOCUMENTS 3,085,530 A 4/1963 Williamson
3,206,153 A * 9/1965 Burke ........................... 248/578
3,284,076 A * 11/1966 Gibson ......................... 267/175
3,528,700 A * 9/1970 Janu et al. ..................... 297/211
3,575,442 A 4/1971 Elliott et al.
3,701,544 A * 10/1972 Stankovich ................... 280/276
3,784,228 A 1/1974 Hoffmann et al.
3,830,482 A * 8/1974 Norris .......................... 267/286
4,103,881 A * 8/1978 Simich .......................... 267/177
4,348,016 A * 9/1982 Milly ............................ 267/177
4,655,440 A 4/1987 Eckert
4,732,244 A 3/1988 Verkuylen
4,744,444 A * 5/1988 Gillingham ................... 188/315
4,773,671 A 9/1988 Inagaki
4,830,395 A * 5/1989 Foley ..................... 280/124.162
4,836,578 A 6/1989 Soltis
4,949,262 A 8/1990 Buma et al.
4,949,989 A 8/1990 Kakizaki et al.
4,984,819 A 1/1991 Kakizaki et al.
5,027,303 A 6/1991 Witte
5,044,614 A * 9/1991 Rau .............................. 267/221
5,060,959 A * 10/1991 Davis et al. ................ 280/5.514
5,074,624 A 12/1991 Stauble et al.
5,094,325 A 3/1992 Smith
5,105,918 A 4/1992 Hagiwara et al.
5,152,547 A 10/1992 Davis
5,203,584 A 4/1993 Butsuen et al.
5,348,112 A * 9/1994 Vaillancourt ................. 180/227
5,390,949 A 2/1995 Naganathan et al.
5,553,836 A * 9/1996 Ericson ........................ 267/286
5,598,337 A 1/1997 Butsuen et al.
5,722,645 A * 3/1998 Reitter ......................... 267/177
5,803,443 A * 9/1998 Chang .......................... 267/221
5,954,318 A * 9/1999 Kluhsman .................... 267/175
5,971,116 A 10/1999 Franklin
6,017,047 A 1/2000 Hoose
6,035,979 A 3/2000 Foerster
6,058,340 A 5/2000 Uchiyama et al.
6,073,736 A 6/2000 Franklin
6,135,434 A 10/2000 Marking
6,244,398 B1 6/2001 Girvin et al.
6,254,067 B1 7/2001 Yih
6,311,962 B1 11/2001 Marking
6,360,857 B1 3/2002 Fox et al.
6,389,341 B1 5/2002 Davis
6,427,812 B2 8/2002 Crawley et al.
6,434,460 B1 8/2002 Uchino et al.
6,592,136 B2 7/2003 Becker et al.
6,732,033 B2 5/2004 LaPlante et al.
6,857,625 B2 * 2/2005 Loser et al. ................... 267/175
6,863,291 B2 3/2005 Miyoshi
6,991,076 B2 1/2006 McAndrews
7,076,351 B2 7/2006 Hamilton et al.
7,128,192 B2 10/2006 Fox
7,135,794 B2 * 11/2006 Kuhnel .......................... 310/80
7,163,222 B2 1/2007 Becker et al.
7,287,760 B1 10/2007 Quick et al.
7,293,764 B2 11/2007 Fang
7,316,406 B2 1/2008 Kimura et al.
7,363,129 B1 4/2008 Barnicle et al.
7,374,028 B2 5/2008 Fox
7,397,355 B2 7/2008 Tracy
7,469,910 B2 12/2008 Münster et al.
7,484,603 B2 2/2009 Fox
7,490,705 B2 2/2009 Fox
7,631,882 B2 12/2009 Hirao et al.
7,694,987 B2 4/2010 McAndrews
7,703,585 B2 4/2010 Fox
7,857,325 B2 * 12/2010 Copsey et al. ............. 280/6.157
7,872,764 B2 1/2011 Higgins-Luthman et al.
8,087,676 B2 1/2012 McIntyre
8,127,900 B2 3/2012 Inoue
8,210,106 B2 * 7/2012 Tai et al. ....................... 105/453
8,262,100 B2 * 9/2012 Thomas ..................... 280/5.514
8,285,447 B2 10/2012 Bennett et al.
8,336,683 B2 12/2012 McAndrews et al.
8,458,080 B2 6/2013 Shirai
8,550,551 B2 10/2013 Shirai
8,622,180 B2 1/2014 Wootten et al.
8,763,770 B2 7/2014 Marking
8,936,139 B2 1/2015 Franklin et al.
2002/0032508 A1 3/2002 Uchino et al.
2002/0089107 A1 * 7/2002 Koh ............................. 267/218
2002/0113347 A1 8/2002 Robbins et al.
2003/0001358 A1 1/2003 Becker et al.
2003/0065430 A1 4/2003 Lu et al.
2003/0160369 A1 8/2003 LaPlante et al.
2004/0256778 A1 * 12/2004 Verriet .......................... 267/218
2005/0110229 A1 5/2005 Kimura et al.
2006/0064223 A1 3/2006 Voss
2006/0163787 A1 * 7/2006 Munster et al. ............... 267/221
2006/0185951 A1 8/2006 Tanaka
2006/0289258 A1 12/2006 Fox
2007/0008096 A1 1/2007 Tracy
2008/0018065 A1 * 1/2008 Hirao et al. ................ 280/6.157
2008/0093820 A1 4/2008 McAndrews
2008/0116622 A1 5/2008 Fox
2009/0121398 A1 * 5/2009 Inoue ....................... 267/140.14
2009/0236807 A1 9/2009 Wootten et al.
2009/0261542 A1 * 10/2009 McIntyre .................. 280/6.157
2009/0277736 A1 11/2009 McAndrews et al.
2010/0010709 A1 1/2010 Song
2010/0044975 A1 2/2010 Yablon et al.
2010/0244340 A1 9/2010 Wootten et al.
2010/0252972 A1 10/2010 Cox et al.
2010/0276906 A1 11/2010 Galasso et al.
2011/0109060 A1 5/2011 Earle et al.
2011/0257848 A1 10/2011 Shirai
2012/0253599 A1 10/2012 Shirai

FOREIGN PATENT DOCUMENTS

EP 1241087 A1 9/2002
EP 1355209 A1 10/2003
JP 57173632 U 11/1982
JP 57182506 A 11/1982
JP 01106721 A 4/1989
JP 04-203540 7/1992
JP 05-149364 6/1993
WO 98/40231 9/1998
WO 99/06231 2/1999

OTHER PUBLICATIONS

"European Search Report and Written Opinion, European Patent Application No. 13165362.8", Sep. 24, 2014, 6 Pages.
European Search Report, European Patent Application No. 14189773.6, May 4, 2015, 4 Pages.

* cited by examiner 100
255
220
250
260
210
150
212
200
215
120
190
175
125
180
195

METHODS AND APPARATUS FOR SELECTIVE SPRING PRE-LOAD ADJUSTMENT

CROSS-REFERENCE TO RELATED APPLICATIONS

This application claims benefit of U.S. provisional patent application Ser. No. 61/161,552, filed Mar. 19, 2009, and U.S. provisional patent application Ser. No. 61/161,620, filed Mar. 19, 2009. Each of the aforementioned related patent applications is herein incorporated by reference.

BACKGROUND OF THE INVENTION

1. Field of the Invention

Embodiments of the present invention generally relate to a user-adjustable spring for use in a shock absorber.

2. Description of the Related Art

Integrated damper/spring vehicle shock absorbers often include a damper body surrounded by a mechanical spring. The damper often consists of a piston and shaft telescopically mounted in a fluid filled cylinder. The mechanical spring may be a helically wound spring that surrounds the damper body. Various integrated shock absorber configurations are described in U.S. Pat. Nos. 5,044,614; 5,803,443; 5,553,836; and 7,293,764; each of which is herein incorporated, in its entirety, by reference.

The spring mechanism of many shock absorbers is adjustable so that it can be preset to varying initial states of compression. In that way the shock absorber can be adjusted to accommodate heavier or lighter carried weight, or greater or lesser anticipated impact loads. In motorcycle racing, particularly off-road racing, shock absorbers may be adjusted according to certain rider preferences.

U.S. Pat. No. 5,044,614 ("the '614 patent") shows a damper body carrying a thread 42. A helical spring 18 surrounds the damper body where the two form an integrated shock absorber. The compression in the helical spring 18 may be pre-set by means of a nut 48 and a lock nut 50. Because the nut 48 and lock nut 50 must be relatively torqued to prevent nut 50 rotation upon final adjustment, the shock absorber must typically be removed from its vehicle in order to allow torquing wrench access. Once the spring 18 is in a desired state of compression, lock nut 50 is rotated, using a wrench, up against nut 48 and tightened in a binding relation therewith.

The system described in the '614 patent requires that the user be able to access a large amount of the circumference of the shock absorber, and specifically the nut 48 and lock nut 50, with a wrench (e.g. col. 4, lines 15-17). Unfortunately many shock absorbers, as mounted on a corresponding vehicle, are fairly inaccessible, and have limited surrounding wrench space because of other surrounding vehicle hardware and/or, as in the instant case, a separate damping fluid reservoir or "piggyback." What is needed is a shock absorber having a spring that can be readily adjusted while the shock absorber is mounted on a vehicle. What is needed is a motorcycle "monoshock" having a spring that can be easily adjusted without removing the shock from the motorcycle. What is needed is a shock absorber having a spring where the state of spring adjustment is constantly indicated and easily visible while the shock is mounted on a vehicle.

SUMMARY

The present invention generally relates to a suspension comprising a spring assembly having a threaded member at a first end for imposing axial movement in the spring as the spring is rotated and thereby rotating the threaded member relative to a second component. In one embodiment, the system includes a damper for metering damping fluid and a rotatable spring member coaxially disposed around the damper and rotatable relative to the damper. In one embodiment an adjustment assembly includes a spring adjustment nut (e.g. follower nut) and clamp with the adjustment nut disposed on a threaded portion of the second component. When the clamp is loosened, the adjustment or "follower" nut rotates with the spring which is rotated by a user and the rotation thereby compresses or decompresses the spring as the nut moves axially (by thread pitch) along the threaded second component. In one embodiment, the clamp includes an indicator that cooperates with markings on the second component to indicate the compression state of the spring.

BRIEF DESCRIPTION OF THE DRAWINGS

So that the manner in which the above recited features of the present invention can be understood in detail, a more particular description may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
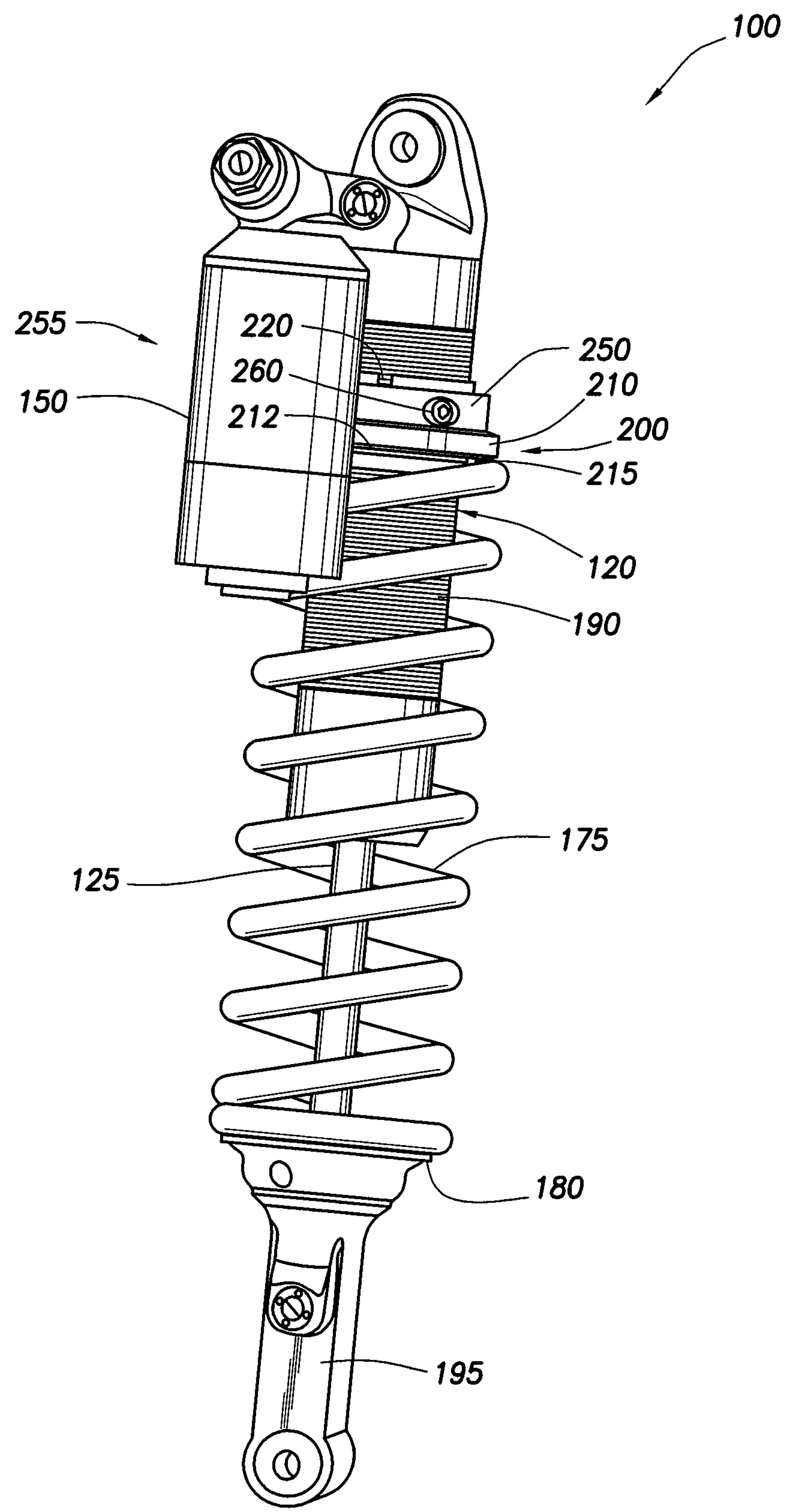
FIG. 1 is a perspective view of a shock absorber having a user-adjustable spring.

FIG. 1 shows an embodiment of a reservoir type shock absorber 100. The shock absorber includes a second component, such as in this embodiment a damper body 120, with a rod 125 extending therefrom and a reservoir 150 is in fluid (e.g. damping fluid such as hydraulic oil) communication with the damper body 120. The shock further includes a helical spring 175 annularly disposed about the damper body 120 and captured axially between a bottom clip 180 at a lower end and an adjuster assembly 200 at an upper end. An outer surface of the damper body 120 includes threads 190 that facilitate rotation of nut 210 and corresponding axial movement of the adjuster assembly 200 relative to the body 120.

One embodiment of the adjuster assembly 200 is best appreciated with reference to all of the Figures and comprises a follower nut 210 and a clamp 250. In one embodiment the follower nut 210 includes a pin 215 for fitting into a hole 216 (shown in FIG. 2) in a flange of the nut 210. Referring to FIG. 3, the pin 215 rotationally indexes the follower nut 210 to the spring 175 at an interface 300 between an abrupt end 470 of the wound wire and an upwardly inclined upper surface of the same wound wire in the coil preceding (i.e. directly underneath) the abrupt end 470 of the helical spring 175. In one embodiment, pin 215 extends axially (i.e. parallel to the longitudinal axis of the shock absorber 100) downward from follower nut 210 and extends into the interface space 300. Due to interference between the pin 215 and the abrupt end 470 of spring 175 in one direction (referring to FIG. 3) and the helical angle of the spring wire in the other direction where the end and the angle combined form an axial recess at an upper end of the spring 175, rotation of the spring 175 will interfere with the pin (or key or tooth) 215 and impart a rotational force (via the pin 215) to the follower nut 210. Conversely, rotation of the follower nut 210 will carry the pin 215 and a rotational force will be correspondingly transmitted to the spring 175. In one embodiment (not shown) an upper portion of the spring 175 adjacent the abrupt end 470 is tapered to increase the surface contact between the spring and a lower end of the follower nut 210 (i.e. the spring end is ground "flat"). In one embodiment (not shown) the flattened last coil portion of the upper end of the spring includes an axial hole drilled therein for receiving the portion of pin 215 that protrudes from hole 216. In one embodiment the upper end of the spring is castellated and the lower surface 212 of the nut 210 is castellated such that the castellations of the nut and the spring are interengageable for rotationally fixing the nut 210 to the spring 175. In one embodiment, the nut 210 includes a ratcheting pawl set on a lower surface thereof and the spring includes suitable beveled one way castellations on an upper surface thereof (or vice versa) and the spring and the nut are therefore rotationally engaged in one rotational direction only (depending on the sense of the ratchet set) and relatively freely rotatable in the other rotational direction. In one embodiment, the spring 175 is rotatable in relation to the bottom clip 180. In another embodiment the bottom clip 180 is bearing-mounted (e.g. with a race of ball bearings disposed between a lower end of the spring and an upward facing surface of the bottom clip 180 in axially abutting relation to each) to a shock mount 195 and thereby facilitates easier rotation of the spring 175 relative to the damper body 120 (by reducing the relative apparent coefficient of friction between the bottom clip and the lower end of the spring). In one embodiment, the spring comprises a plurality of springs axially abutted one with another where each of the springs has a different spring rate. In one embodiment, at least one spring of a shock absorber is wound having a compound spring rate. It is worth noting that as the spring 175 is placed in greater states of compression, the friction force between the spring 175 and its axial abutments at the clip 180 and the follower nut 210 are increased.

While the follower nut 210 is a separate component in some embodiments, it will be understood that the nut can be integral with the spring 175 whereby one end of the spring is therefore effectively threaded to the damper housing and axially adjustable upon rotation of the spring while an opposite end of the spring is axially fixed but rotationally movable relative to the damper body. In one embodiment, the clamp member can also be formed to simply include a threaded member, for instance, that interacts with the damper body to prevent rotation between the threads of the integral spring/nut/clamp and the threaded damper body. In one embodiment, the bottom portion 180 includes a cylindrical member, or body, (not shown) axially and upwardly disposed within and along the spring 175. In one embodiment the cylindrical member is threaded along an axial exterior length thereof. In one embodiment an adjustment assembly 200 is located between bottom clip or annular "lip" 180 and a lower end of the spring 175. Much as has been previously described in relation to threads 190 and the nut 210, in one embodiment the threads 211 on an inner diameter of nut 210 are engaged with threads on an outer diameter of the cylindrical member (not shown). The pin 215 engages a recess 300 at a lower end of the spring 175. As previously described, rotation of the spring 175 correspondingly rotates the nut 210, via pin 215, and the nut 210 translates axially along the cylindrical member thereby increasing or decreasing the compression in the spring 175 depending on the direction of rotation and the directional "sense" of the threads. In one embodiment the cylindrical member (not shown) has an inner diameter that is larger than the outer dimensions of the spring and is disposed axially upward along the shock and outside of the spring. A nut is threaded on an outer diameter thereof and engaged with an end of the spring and the cylinder is threaded on an inner diameter thereof and the nut, cylinder and spring cooperate as principally described herein to facilitate adjustment of compression in the spring. In one embodiment the spring includes an assembly 200 and corresponding threaded sections (e.g. 190, cylindrical member) at each of its ends. In one embodiment the threads at each end are opposite in "sense" so that rotation of the spring increases or decreases compression in the spring twice as fast as a single threaded end version. In one embodiment threads at one end are of a different pitch than threads at the other end of the spring 175.

Figure 2A:
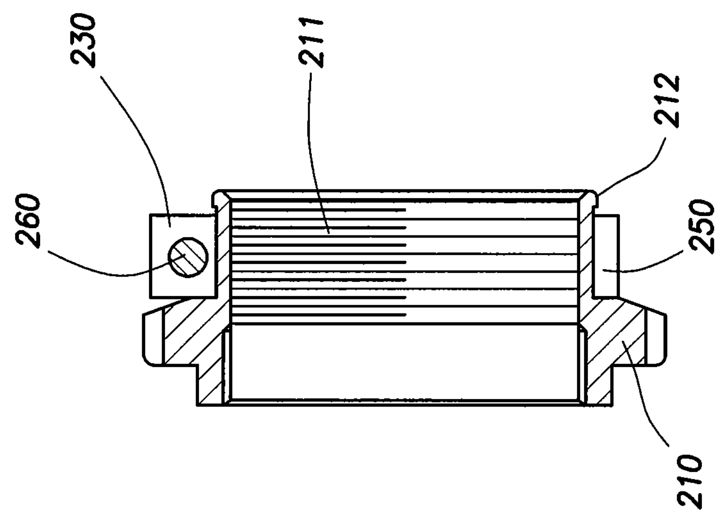
FIG. 2 is an exploded view of a follower nut and clamp, and 2A is a section view thereof.
Figure 2:
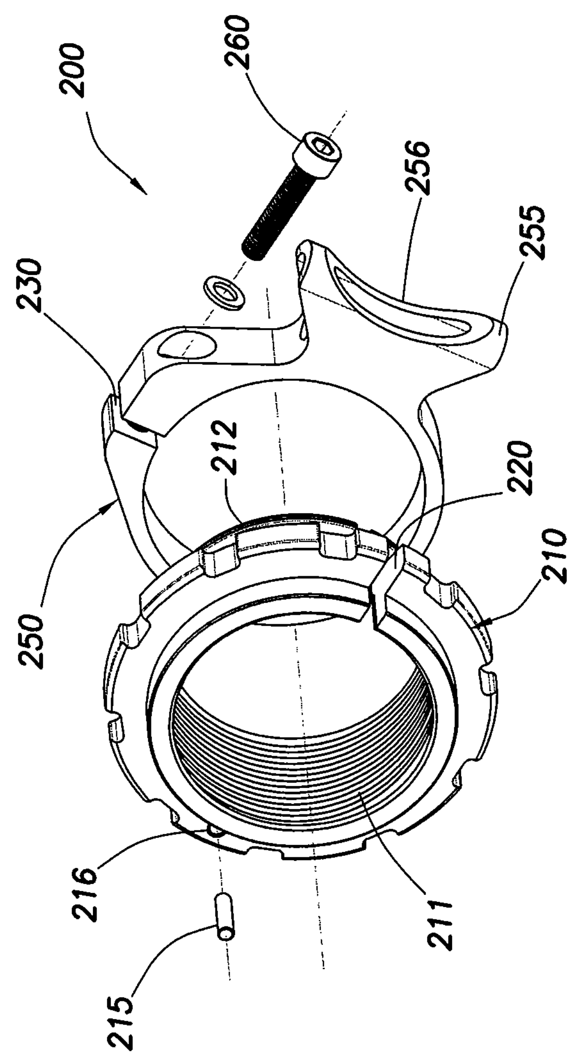
Figure 3:
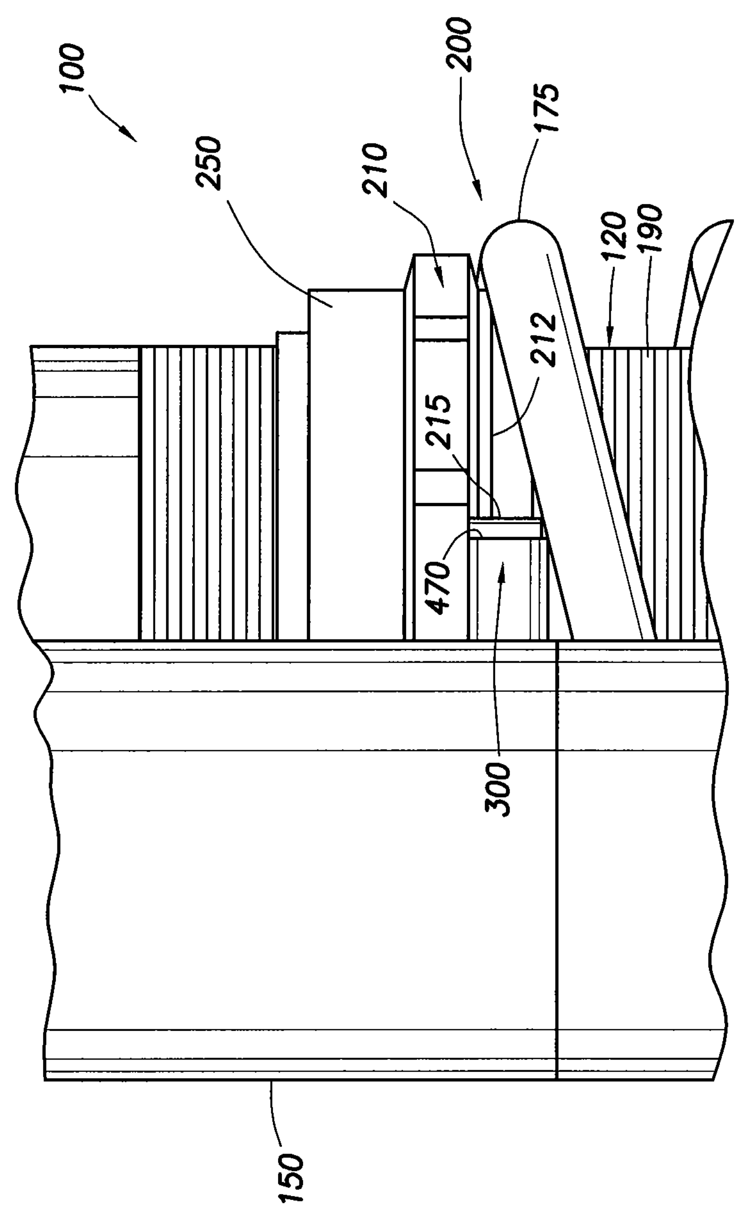
FIG. 3 is an enlarged view showing an interface between the clamp, follower nut and spring.
Figure 4:
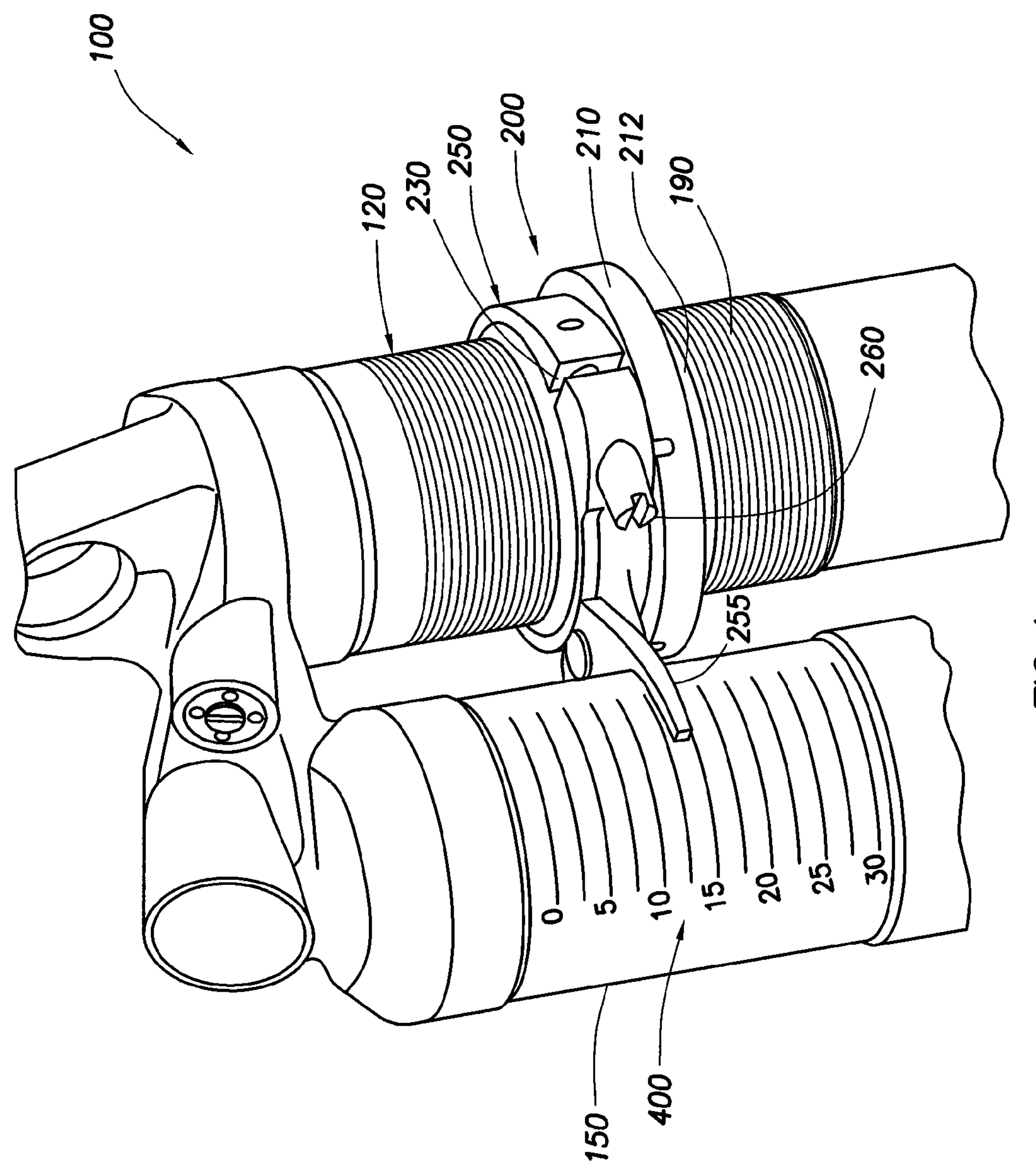
FIG. 4 is a perspective detailed view of the shock absorber.

FIGS. 2 and 2A show details of embodiments of the clamp 250 and follower nut 210. In one embodiment the follower nut 210 is cylindrical (with varying diameters along its length) generally with a cut though or split 220, giving it the form of a "C" ring. The clamp 250 is also in the form of a "C" ring, being generally cylindrical and having its own cut or split 230. As can be seen in FIG. 2A, the clamp 250 fits over the follower nut 210. In one embodiment the clamp 250 is expanded elastically at the split 230 to clear a lip 212 at a smaller-diameter end of the follower nut. Once the clamp 250 has cleared the lip, it is returned to a "relaxed" state surrounding a portion of the nut 210 and is rotationally movable relative thereto. The clamp 250 may then rotate about the follower nut 210 (and the follower nut 110 may rotate within the clamp 250) but the clamp 250 is retained axially on the follower nut 210 by lip 212. In one embodiment a screw 260, with a suitable washer is inserted into the clamp 250 but not tightened until such time as rotational and axial retention of the follower nut 210 on the damper body 120 (e.g. because spring adjustment is complete) is desired. In one embodiment, the adjuster assembly 200, with its nut 210 and clamp 250, is threaded onto threads 190 of body 120, and is moved axially (e.g. by rotation of the threaded (211) nut 210 about threads 190) until an indicator 255 (best seen in FIGS. 2 and 4) formed on the clamp 250 is located adjacent the reservoir 150. In one embodiment a curved surface 256 of the indicator 255, corresponding generally to the curved shape of the reservoir body is aligned with the exterior of the reservoir 150 and the follower nut 210 and clamp 250 may be axially translated further toward a lower end of the shock 100 by rotation of follower nut 210 (while clamp 250 remains aligned with reservoir 150 via indicator 255). Tightening the screw 260 "closes" the C-shaped clamp 250 and correspondingly closes the follower nut 210 thereby preventing the follower nut 210 from rotating on the threaded surface 190 of the damper body 120, and therefore frictionally (e.g. as a clamp) locking the nut 210 to the damper body and thus retaining the user-adjusted compression in the spring 175.

In one embodiment the indicator 255 connected on clamp 250, and rotationally fixed relative to the clamp 250, serves at least two purposes. Its curved surface 256 conforms to a portion of an exterior of the reservoir 150, thereby preventing rotation of the clamp 250 during rotation of the spring 175. As such the orientation of screw 260 is maintained relative to the shock absorber and the vehicle on which the shock absorber is mounted. Correspondingly, the screw 260 is maintained in an accessible location for tightening and loosening to facilitate spring 175 adjustment while the shock absorber remains mounted on the vehicle. Second, the indicator 255 serves to indicate axial compression state of the spring 175 relative to a scale 400 (referring to FIG. 4).

In one example, the clamp 250 is loosened by inserting an appropriate hex or blade type wrench or screw driver (not shown) through a predetermined shock absorber access space available in the vehicle (vehicle such as a monoshock rear shock motorcycle) and rotating screw 260 counterclockwise (assuming a right hand thread screw 260) to loosen the clamp. Once the clamp 250 is loose, the spring 175 can be manually gripped, through the access space, by a user and rotated manually, for example, in one embodiment having right hand threads 190 from the top axial view of the shock absorber, clockwise as viewed from the upper end, to increase compression or pre-load in the spring 175. In that embodiment rotating the spring 175 counterclockwise as viewed from above reduces pre-load of the spring 175 (or vice versa depending on the sense of threads 190). As previously described, such rotation of the spring 175 causes rotation of the follower nut 210 and corresponding axial translation of the follower nut 210 (based on the pitch of the threads 190) relative to the damper body 120 and along threads 190. Axial movement of the follower nut 210, relative to non-axially moving bottom clip 180, increases or decreases compression pre-load in spring 175. In one embodiment, when the desired pre-load is obtained, as indicated by movement of the indicator 255, which moves axially with the nut 210, relative to the scale 400, the clamp 250 is retightened by rotating screw 260 clockwise. It should be noted that the scale 400 may be placed on any suitable and axially static component relative to the follower nut 210/clamp 250 and the indicator 255 may be structured to "point" appropriately thereto. In one embodiment the numerical markers on the scale 400 are indicative of a percentage of compression preload in the spring. In one embodiment, the scale and indicator are visible from an exterior of an assembled vehicle with the shock absorber having the scale and indictor mounted thereon. In one embodiment, the scale 400 and indicator 255 "pair" comprise a longitudinal wire coil and permanent magnet. Position of the magnet relative to the coil is indicated by a state of current through the coil and can be calibrated to correspond to a state of spring compression. In one embodiment the "scale/indicator" pair comprises a proximity sensor and a datum structure. In one embodiment an electronic "scale/indicator" pair is connected to a transmission circuit having wireless protocol capabilities, such as Garmin's ANT plus, and shock spring compression data is transmitted in real time or in packets to a user interface/output device such as for example Garmin's 705 edge GPS enabled computer. In one embodiment the shock absorber is a monoshock and is accessible and visible, while mounted in a functional position, through a limited access space of the monoshock equipped vehicle.

While the foregoing is directed to certain embodiments of the present invention, other and further embodiments of the invention may be devised without departing from the basic scope thereof, and the scope thereof is determined by the claims that follow.

The invention claimed is:

1. A vehicle suspension comprising:

a spring annularly disposed about a damper body, the spring comprising:

a set of coils having a first end and a second end, wherein the outer surface of the damper body comprises threads, wherein the spring has a threaded member rotationally indexed thereto by a pin member, a first end of the pin member being fixedly inserted into a hole of the threaded member and a second end of the pin member positioned at an interface between a first end of the spring and an upwardly inclined upper surface of the spring in a coil preceding and directly underneath the first end of the spring, wherein the threaded member moves relative to the threads of the damper body and provides axial movement to the first end of the spring as the spring is rotated.

2. The suspension of claim 1, wherein the spring is axially constrained at the second end relative to at least a portion of the damper body.

3. The suspension of claim 2, wherein the threaded member is a follower nut.

4. The suspension of claim 3, wherein the follower nut is rotationally fixable in a predetermined axial position relative to the damper body to which it is threaded.

5. The suspension of claim 4, whereby rotatable fixing is provided with a clamp, the clamp circumferentially housing the follower nut and fixable to the nut in a manner causing interference between threads of the nut and the threads of the damping body.

6. A suspension system with a user-adjustable spring member, the suspension system comprising:

a cylindrical body, an outer surface of the cylindrical body comprising threads;

a rotatable spring member coaxially disposed around the cylindrical body, the rotatable spring member rotatable relative to the cylindrical body and comprising a set of coils having a first end and a second end; and a follower nut disposed in threaded engagement with the threads of the cylindrical body and abutting a first end of the rotatable spring member, wherein the follower nut is rotationally indexed to the rotatable spring member by a pin member, wherein the pin member has a first end and a second end, wherein the first end of the pin member is fixedly inserted into a hole of the threaded member and a second end of the pin member is positioned at an interface between a first end of the rotatable spring member and an upwardly inclined upper surface of the rotatable spring member in a coil preceding and directly underneath the first end of the rotatable spring member.

7. The suspension system of claim 6, wherein the follower nut is constructed and arranged to affect compression of the rotatable spring member while translating axially along the threads threads.

8. The system of claim 7, further including a clamp, the clamp constraining the follower nut in a rotational position corresponding to a desired amount of spring compression.

9. The system of claim 6, whereby interference between the pin member and the rotatable spring member causes the rotatable spring member and follower nut to rotate together.

10. The system of claim 6, wherein at least one of the rotatable spring member and follower nut rotates as the other of the rotatable spring member and follower nut is manually rotated.

11. The system of claim 8, wherein the axial position of the follower nut is indicated relative to an adjacent component of the suspension system.

12. The system of claim 11, wherein the adjacent component is a reservoir operable with a damper.

13. The system of claim 11, wherein one of the clamp and adjacent member has an indicator and one of the clamp and adjacent member has a scale, the indicator and scale operable to indicate the amount of spring compression.

14. A method for adjusting a vehicle suspension comprising:

freeing a spring adjustment nut so that it is rotatable relative to a suspension body of a suspension component;

rotating a spring about the suspension body and thereby rotating the spring adjustment nut, wherein the spring is annularly disposed about the suspension body and comprises a set of coils having a first end and a second end, wherein the outer surface of the suspension body comprises threads, wherein the spring has a threaded member rotationally indexed thereto by a pin member, a first end of the pin being fixedly inserted into a hole of the threaded member and a second end of the pin positioned at an interface between a first end of the spring and an upwardly inclined upper surface of the spring in a coil preceding and directly underneath the first end of the spring, wherein upon the rotating the spring, the threaded member moves relative to the threads of the suspension body and provides axial movement to the first end of the spring as the spring is rotated; and restraining the spring adjustment nut from rotation about the suspension body.

15. The method of claim 14, wherein the spring adjustment nut is freed by loosening a clamp that retains the spring adjustment nut in a rotational position relative to the suspension body.

16. The method of claim 15, wherein rotation of the spring adjustment nut is due to an engagement between the spring adjustment nut and the spring.

17. The method of claim 14, further including the step of determining an amount of rotation on an indicator and an adjacent scale.

18. An adjustment apparatus for a motorcycle shock absorber, comprising:

a spring adjustment nut abutting a compression spring of a rear shock, wherein rotation of the spring adjustment nut affects the amount of compression in the compression spring, wherein the compression spring is annularly disposed about a damper body and comprises a set of coils having a first end and a second end, wherein the surface of the damper body comprises threads;

a clamp substantially circumscribing the spring adjustment nut and comprising a fastener; and a pin rotationally indexing the spring adjustment nut to the compression spring in at least one rotational direction, wherein a first end of the pin is fixedly inserted into a hole of the spring adjustment nut and a second end of the pin is positioned at an interface between a first end of the compression spring and an upwardly inclined upper surface of the compression spring in a coil preceding and directly underneath the first end of the compression spring, wherein the spring adjustment nut moves relative to the threads of the damper body and provides axial movement to the first end as the compression spring is rotated.

19. The adjustment apparatus of claim 18, wherein the spring adjustment nut is in a threaded relationship with the damper body and axially movable relative thereto.

20. The adjustment apparatus of claim 18, further including an indicator for indicating an amount of spring compression.

21. The adjustment apparatus of claim 18, wherein the fastener and the compression spring are at least partially accessible by a user of the motorcycle.

* * * * *

UNITED STATES PATENT AND TRADEMARK OFFICE

CERTIFICATE OF CORRECTION

PATENT NO. : 9,140,325 B2
APPLICATION NO. : 12/727915
DATED : September 22, 2015
INVENTOR(S) : Christopher Paul Cox et al.

It is certified that error appears in the above-identified patent and that said Letters Patent is hereby corrected as shown below:

IN THE CLAIMS

Column 6, Claim 7, Line 41, Delete “threads threads.”

Insert -- threads. --

Signed and Sealed this
First Day of March, 2016

Michelle K. Lee
*Director of the United States Patent and Trademark Office*